United States Patent
Calvert

(10) Patent No.: US 8,690,219 B1
(45) Date of Patent: Apr. 8, 2014

(54) TELESCOPING CAP-RAILS FOR A TRAILER

(71) Applicant: Telescoping Associates, Trustee for Telescoping Trailer Trust, Manassas, VA (US)

(72) Inventor: S. Mill Calvert, Manassas, VA (US)

(73) Assignee: Telescoping Associates, Manassas, VA (US), Trustee for Telescoping Trailer Trust ( * ) Notice: Subject to any disclaimer, the term of this patent is extended or adjusted under 35 U.S.C. 154(b) by 0 days.

(21) Appl. No.: 14/021,730

(22) Filed: Sep. 9, 2013

Related U.S. Application Data

(63) Continuation-in-part of application No. 13/952,951, filed on Jul. 29, 2013.

(51) Int. Cl.
*B60P 3/00* (2006.01)

(52) U.S. Cl.
USPC .................................. 296/36; 296/3

(58) Field of Classification Search
USPC ................. 296/3, 6, 7, 8, 9, 36, 183.1, 186.1, 296/186.4
See application file for complete search history.

(56) References Cited

U.S. PATENT DOCUMENTS

| | | | |
|---|---|---|---|
| 4,603,901 A * | 8/1986 | McIntosh et al. | 296/165 |
| 4,639,034 A * | 1/1987 | Amos | 296/100.18 |
| 4,703,969 A | 11/1987 | Rayburn et al. | |
| 4,779,916 A * | 10/1988 | Christie | 296/3 |
| 4,848,830 A * | 7/1989 | Parson | 296/165 |
| 5,303,969 A | 4/1994 | Simnacher | |
| 6,152,510 A | 11/2000 | Newsome | |
| 6,340,195 B1 | 1/2002 | Hall et al. | |
| 6,592,162 B2 | 7/2003 | Felix et al. | |
| 6,983,968 B2 * | 1/2006 | Brauer et al. | 296/3 |
| 7,104,583 B2 | 9/2006 | Clare | |
| 7,182,177 B1 | 2/2007 | Simnacher | |
| 2003/0127875 A1 * | 7/2003 | Hornick | 296/32 |
| 2003/0173758 A1 * | 9/2003 | Badger et al. | 280/656 |
| 2008/0079277 A1 * | 4/2008 | Wethington | 296/3 |

* cited by examiner

*Primary Examiner* — Joseph Pape
(74) *Attorney, Agent, or Firm* — Louis Ventre, Jr.

(57) ABSTRACT

Telescoping cap-rails for a trailer are extensible, hidden vertical pillars within two opposing side walls of a trailer. The extensible vertical pillars are connected at the top by a cap-rail sitting atop the side walls. A set of telescoping pillars is added to each of the two side walls bordering the bed of the trailer. When extended, either manually or via a powered option, the vertical pillars, which are joined at the top by the cap-rail, form a skeleton structure of a tall side wall. The cap-rail is a stabilizing connection. The skeleton structure can be used alone or with added horizontal beams inserted through horizontal access ports in the extended pillars. Preferably, the access ports allow passage of a standard 2×4 or other stake through the pillars to create added structural stability to each set of telescoping pillars.

10 Claims, 6 Drawing Sheets

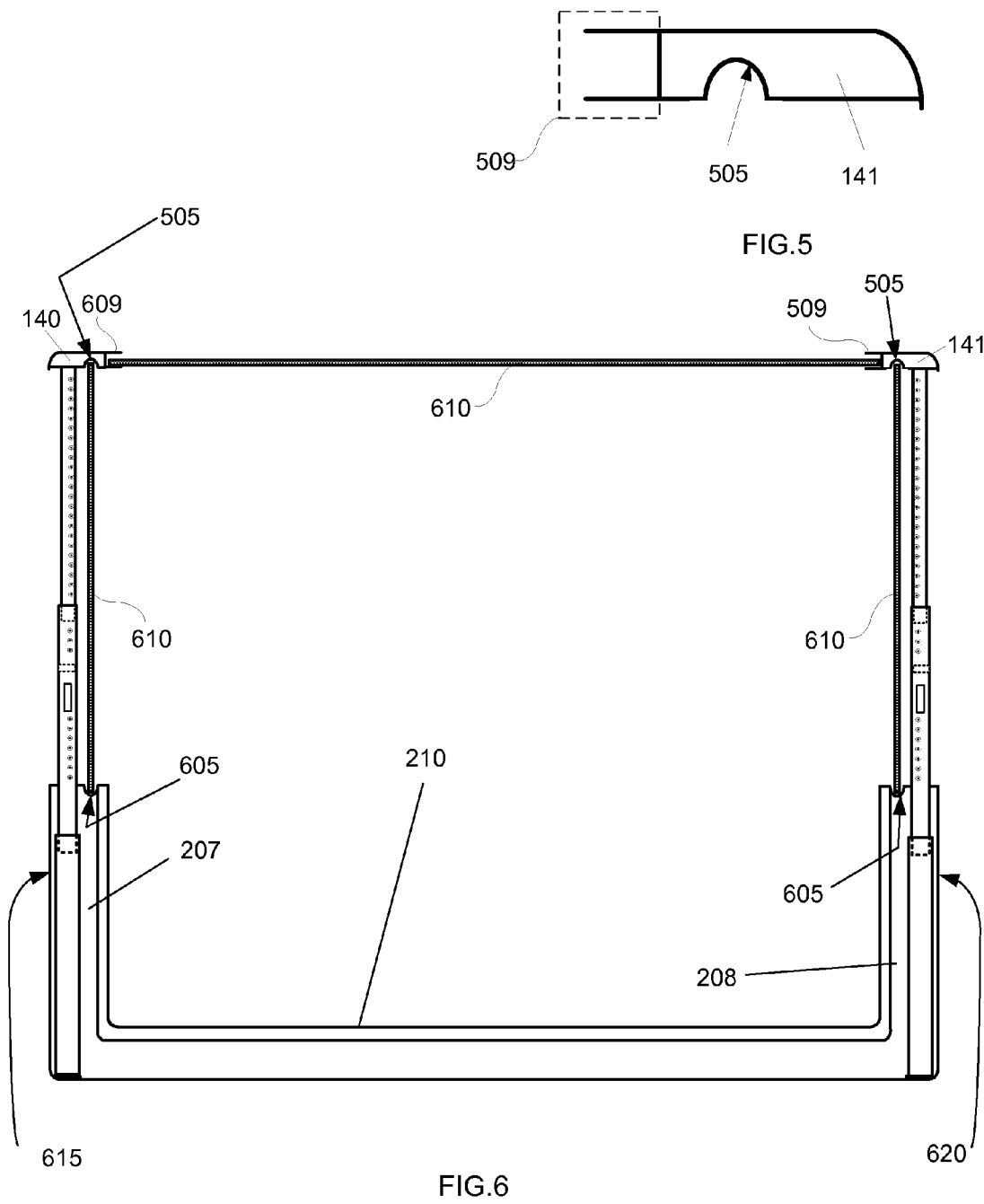

TELESCOPING CAP-RAILS FOR A TRAILER

CROSS-REFERENCE TO RELATED APPLICATIONS

This application is a continuation-in-part of application Ser. No. 13/952,951, filed 29 Jul. 2013, which is hereby incorporated by reference herein.

TECHNICAL FIELD

In the field of land vehicles, a trailer has a bed with side walls containing telescoping cap-rails that increase the height of the side walls to better contain taller loads within the bed.

BACKGROUND ART

Trailers having open cargo compartments, often called beds, are sometimes used for lawnmowers and other commercial service loads. Many trailers are towed by pickup trailers and are purchased by professional tradesmen, each, perhaps, having a small business requiring equipment that must be brought to a service location.

Tie down brackets and after-market fencing installed at the edges of the bed are known to contain and immobilize bulky cargo being transported in the bed. The fencing solution particularly involves unsightly additions of fencing installed to raise the sidewalls of the trailer. The background art discloses after-market elevated sidewalls where the user has options to deploy devices that enable him to erect the fencing with attachments against the sidewalls, rotate a hinged extension upward, or extend fencing stored against the sidewalls.

An additional problem occasionally encountered is transport of bulky cargo with a prospect of the inclement weather during the trip. Prior art often employs separately purchased plastic sheeting. The user then covers or wraps the cargo with rope or tape. While covering the cargo or the entire bed can be helpful, it is often subject to the vagaries of ad hoc solutions.

SUMMARY OF INVENTION

Telescoping cap-rails for a trailer is a system to add extensible, hidden vertical pillars within two opposing side walls of a trailer. The extensible vertical pillars are connected at the top by the side rail sitting atop the side walls. A set of telescoping pillars is added to each of two opposing walls bordering the bed of the trailer. When extended, either manually or via a powered option, the vertical pillars, which are joined at the top by the cap rail, form a skeleton structure of a tall extension wall. The cap rail is an added stabilizing connection. The skeleton structure can be used alone or with added horizontal beams inserted through horizontal access ports in the extended pillars. Preferably, the access ports allow passage of a standard 2×4 or other stake through the pillars to create added structural stability to each set of telescoping pillars. Each side rail may also have a downwardly facing channel and an upwardly facing channel on the side wall that can be used to slide in a sheet of plywood. A set of inwardly facing channels can be used to slide in one or more panels to form a top to the bed. A tarpaulin may be included to snap on to male snap fasteners placed on the pillars so that the tarp can in effect serve to create a covered wagon, with the tarp extended from one side wall up and over the elevated pillars and down to the other side wall to cover the cargo in the bed.

Technical Problem

A traditional trailer has practical limitations to transporting tall and bulky loads. Ad hoc solutions to stabilize tall loads look unprofessional. Aside from the occasional owner frustration, this situation can also present a danger to others from extra-slow transport or from cargo tumbling over a sidewall when the vehicle attempts a turn or makes an unexpectedly fast stop.

Solution to Problem

Manually or with a motor the owner of a trailer can raise the cap-rails connected to telescoping pillars hidden within two opposing walls of the trailer. The skeleton structure of extended pillars is connected at the top by the cap-rails to impart sufficient rigidity to support tall loads in the bed of the trailer. Horizontal 2×4's or other stock lumber can be added through holes in the pillars to reinforce the structural enclosure. These can also be added across the bed to structurally link the extended side walls to each other. Also, a plywood sheet can be slid in place at the side wall using inverted channels at the top and bottom of the extended wall: one channel facing downward at the top on the side rail and another at the top of the side wall facing upward. To form a top cover, one or more plywood sheets can be slid in place over the bed using channels facing each other on the cap-rails. A tarp with snap-on fasteners can be used to cover the extended side walls and form a flexible top over the bed.

Advantageous Effects of Invention

The system for telescoping cap-rails for a trailer hides the extended side walls until there is a need for them. When the need arises for transport of a tall item, a trailer operator manually lifts up the cap rail hand to lock in place an elevated side wall. For those desiring a motorized option, the trailer operator effortlessly pushes a button and transforms the standard low-profile side walls to elevated side walls capable of securing the tall item for transport. When finished with that transport, the operator can just as easily retract the extended side walls into the standard low-profile side walls to again hide the structure comprising the extended side walls.

The system optionally comes with an all-weather flex top that rolls up and stores in a small bag. The flex top can be slid over the top of the extended side wall structure and fastened to the bottom sides with snaps or other fastener. Once installed, it acts just like a trailer cap, so that one can lock up materials in the bed of the trailer, keep articles in the bed dry while driving in the rain, or use it as a camping tent with sleeping bags on the bed.

BRIEF DESCRIPTION OF DRAWINGS

The drawings illustrate preferred embodiments of the telescoping cap-rails for a trailer according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 5 is a side elevation view of a side rail showing a downwardly curved C-shaped segment and a channel.

FIG. 6 is a sectional elevation view of the rear end of a trailer showing two extended telescoping extension poles with plywood sheets installed on the sides and top of the trailer.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
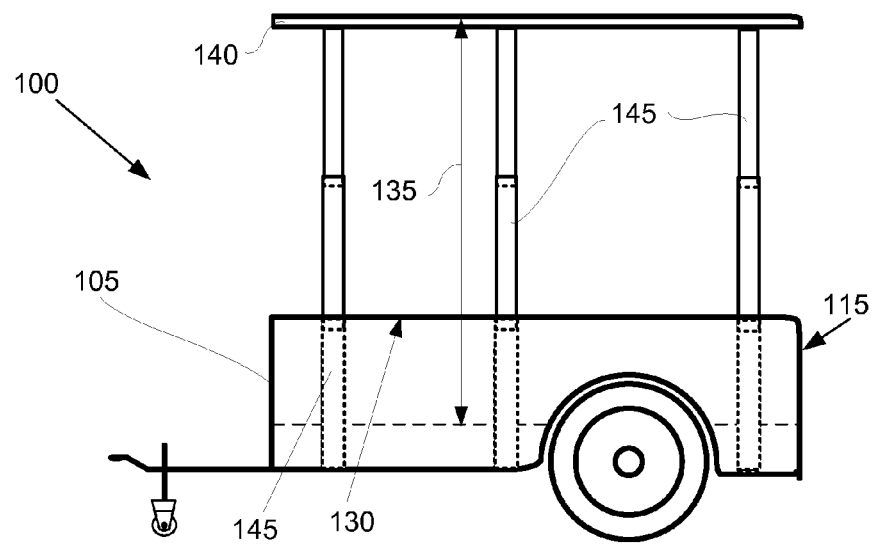
FIG. 1 is a side elevation view of a trailer with the telescoping cap-rails in extended position.

The telescoping cap-rails described herein are best implemented in a system (100) including a trailer (105). FIG. 1 illustrates the system (100) showing telescoping cap-rails, also referred to as telescoping side rails. The trailer (105) is more easily described with reference to FIG. 1, FIG. 2 and FIG. 6.

The trailer (105) is typically an unpowered vehicle used for transporting cargo. For example, the trailer (105) is commonly used by contractors to haul a lawn mower or other power equipment to a job site.

Figure 2:
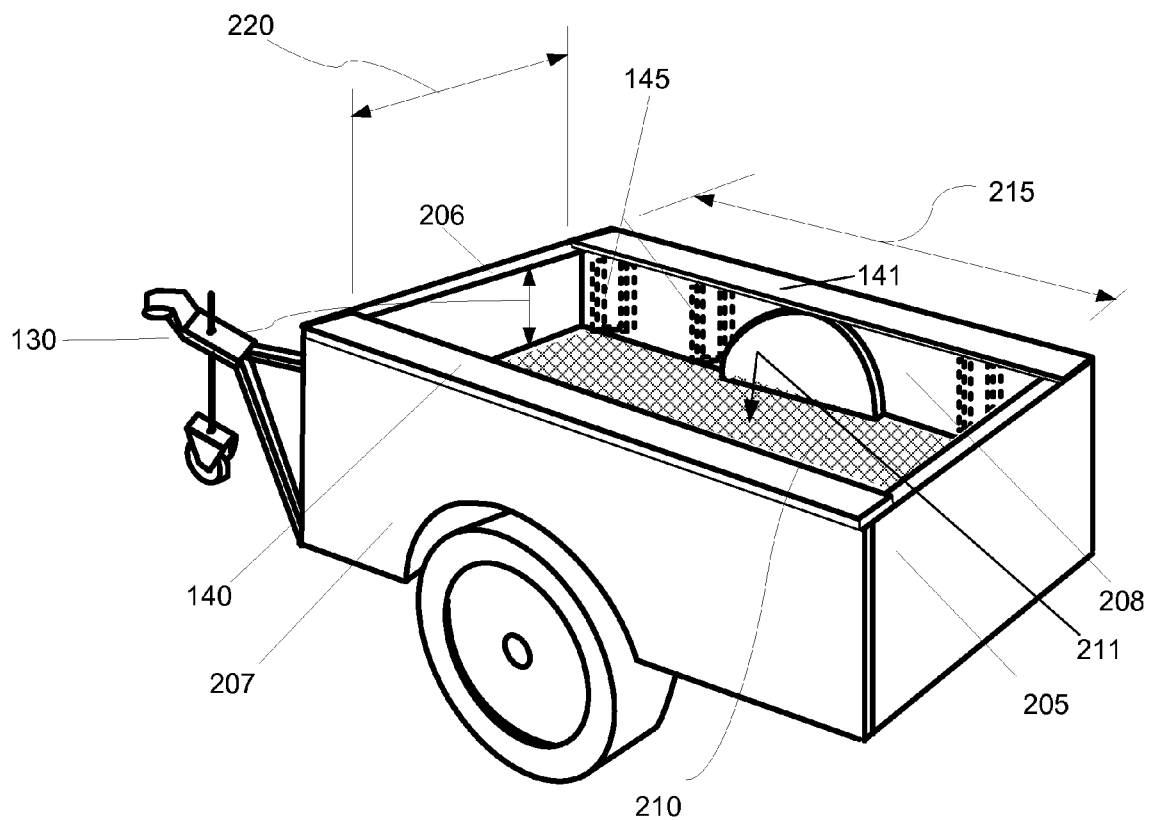
FIG. 2 is a perspective of the rear end of a trailer with the telescoping cap-rails in stowed position.

The trailer (105) is typically removably attachable to a truck or other automotive vehicle equipped for towing. The trailer (105) includes a bed (210) that holds the cargo. The bed (210) is typically a rectangular area (211) that is bounded by four walls of the trailer and is exemplified in FIG. 2 showing a bed (210) defined by a bed-width (220) and a bed-length (215).

The four walls usually include a rear wall (205) at a rear end (115) of the trailer (105) where cargo is loaded and unloaded. The rear wall (205) typically opens, or is removable, to facilitate loading the cargo into the bed (210). The four walls also usually include a front wall (206), which is usually fixed in position; a left-side wall on the trailer-left-side (615) of the (105); and a right-side wall on the trailer-right-side (620). For purposes of the invention any two walls opposing each other with the bed (210) in between may be fitted with the telescoping cap rails. For consistency and ease of illustration and not to limit the invention, the first wall (207) and a second wall (208) are shown in the figures on the left side of the trailer (105) and the right side of the trailer (105), respectively. Preferably, the first wall (207) and the second wall (208) are the left-side wall and the right-side wall of the trailer (105), respectively.

Each of the four walls typically rises more or less vertically from the bed (210) to a first height, referred to herein as the distal end (130), which is typically anywhere from 18 inches to several feet in height over the bed. The first height may be different for each wall. The first wall (207) and the second wall (208) thus rise vertically from the bed to a distal end (130) when the plurality of telescoping extension poles (145) in each said wall is fully retracted.

The trailer (105) includes a first cap-rail (140) atop the first wall (207) and a second cap-rail (141) atop the second wall (208). These cap rails are sometimes referred to as side rails and each forms a top cap or cover on the wall. Usually only the side walls have side rails or cap rails.

The system (100) includes a plurality of telescoping extension poles (145) vertically positioned within each of the first wall (207) and the second wall (208). Each telescoping extension pole in the plurality of telescoping extension poles (145) includes a plurality of pole sections, that is, two or more pole sections. Thus, there is always a pole top-section (305) and a pole bottom-section (315) with any number of additional pole sections in between. Preferably, the plurality of pole sections includes a pole top-section (305); a pole middle-section (310); and a pole bottom-section (315). The pole bottom-section (315) is typically fixed in position and the remaining pole sections are extensibly nested together within the pole bottom-section (315). The pole top-section (305) is also typically connected to the cap-rail so that when the pole sections are extended, the cap-rail, linking the plurality of telescoping extension poles (145) within the same side wall of the trailer (105), is also elevated along with the other extension poles in that side wall. Other arrangements connecting the plurality of telescoping extension poles (145) in both side walls are possible.

Thus, each telescoping extension pole in the first wall (207) is connected at the pole top-section (305) to the first cap-rail (140) and immobilized at the pole bottom-section (315). The same is the case for the second wall (208), namely: each telescoping extension pole in the second wall (208) is connected at the pole top-section (305) to the second cap-rail (141) and immobilized at the pole bottom-section (315).

When the plurality of telescoping extension poles (145) in a side wall is fully contracted, then the top of the cap-rail sits at the distal end (130) of that side wall. Consequently, each pole top-section (305) is extensible upward above the distal end (130), raising the cap-rail, and thus creating a structural skeleton of an elevated wall rising to a new height. An example showing the extended pole sections, and thus the structural skeleton, is illustrated in FIG. 1 where the first cap-rail (140) is at a second height (135).

Figures 8, 9:
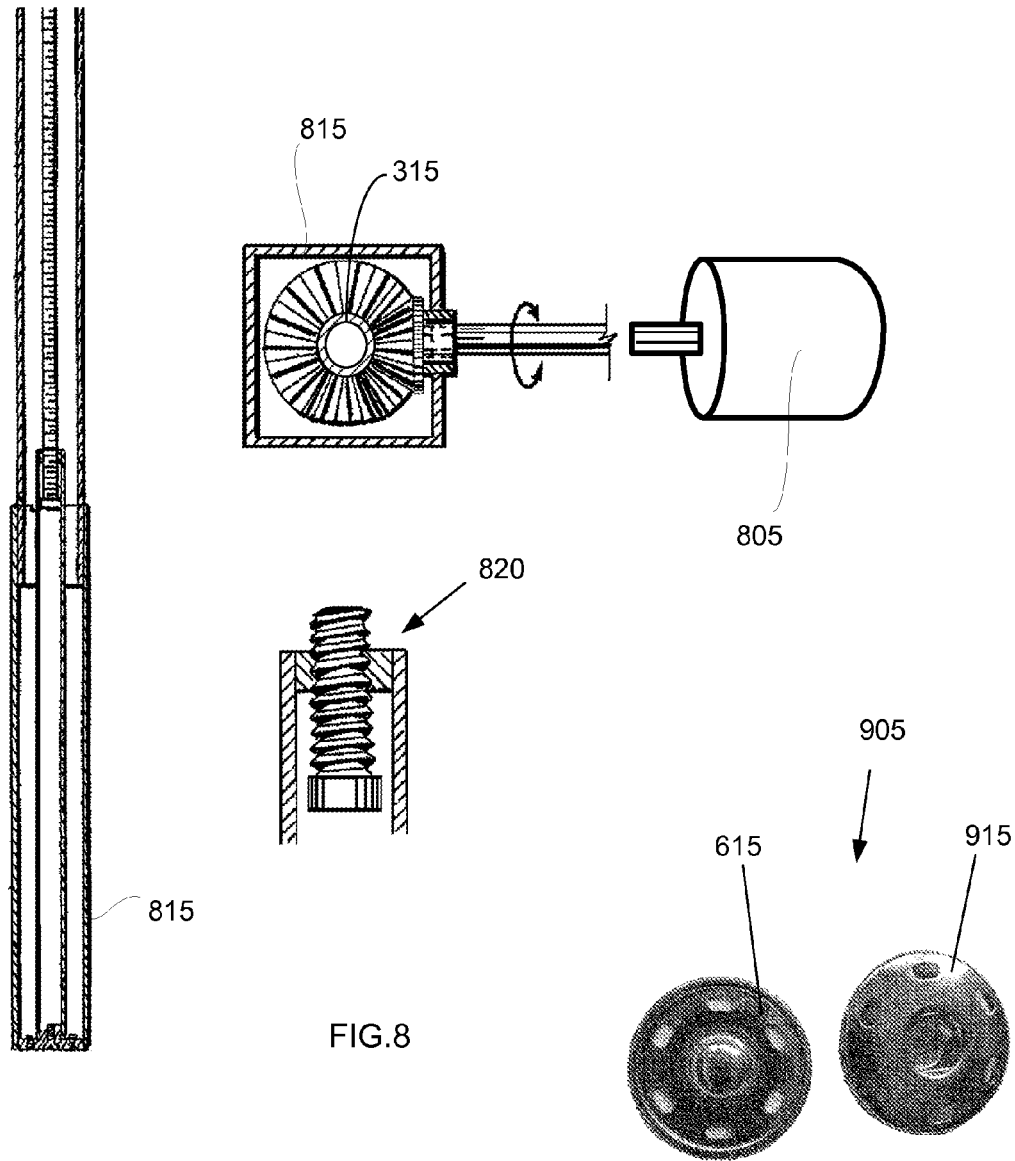
FIG. 8 is a sectional elevation view of a square telescoping side rail and illustrating a motorized screw drive.
FIG. 9 is a top view of a mating snap portions used with the tarpaulin.
Figure 10:
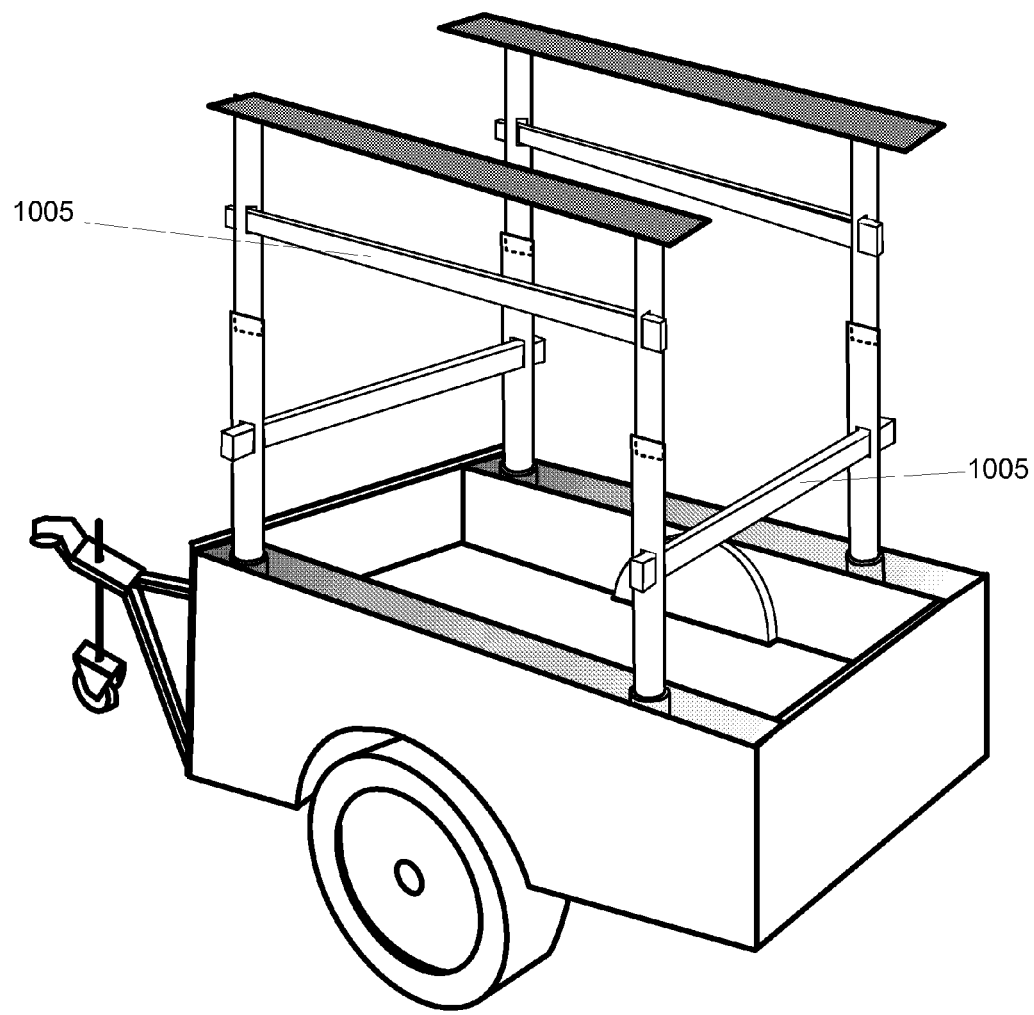
FIG. 10 is a partial perspective view of a trailer with horizontal beams threaded through holes in the telescoping extension poles.

The plurality of telescoping extension poles (145) is two or more nested telescoping extension poles. A trailer (105) with two telescoping extension poles on each side is illustrated in FIG. 10. The poles may have any cross-section, such as round and square. FIG. 8 illustrates a square pole (815).

Figure 3:
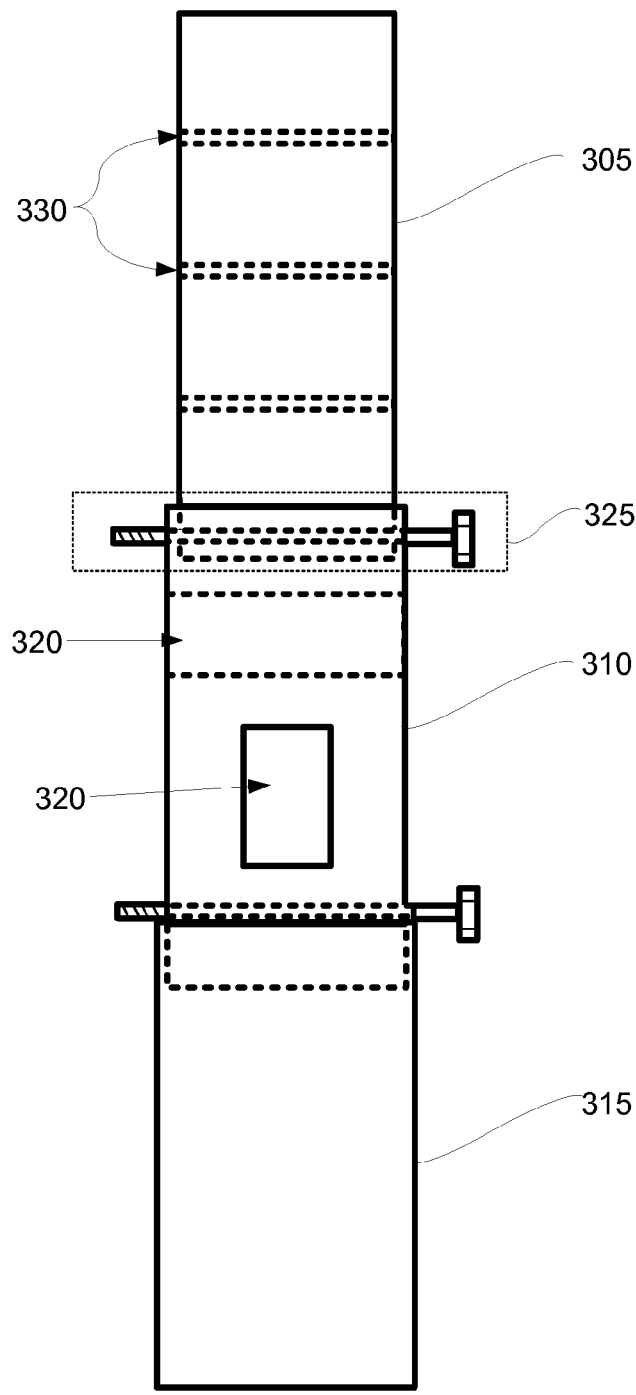
FIG. 3 is an elevation view of telescoping extension poles with bolts and holes for height adjustment.
Figure 4:
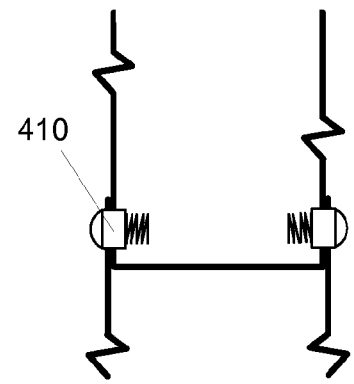
FIG. 4 is a sectional elevation view of the junction of two extended telescoping extension poles showing a push button detent used to lock the poles in position.
Figure 7:
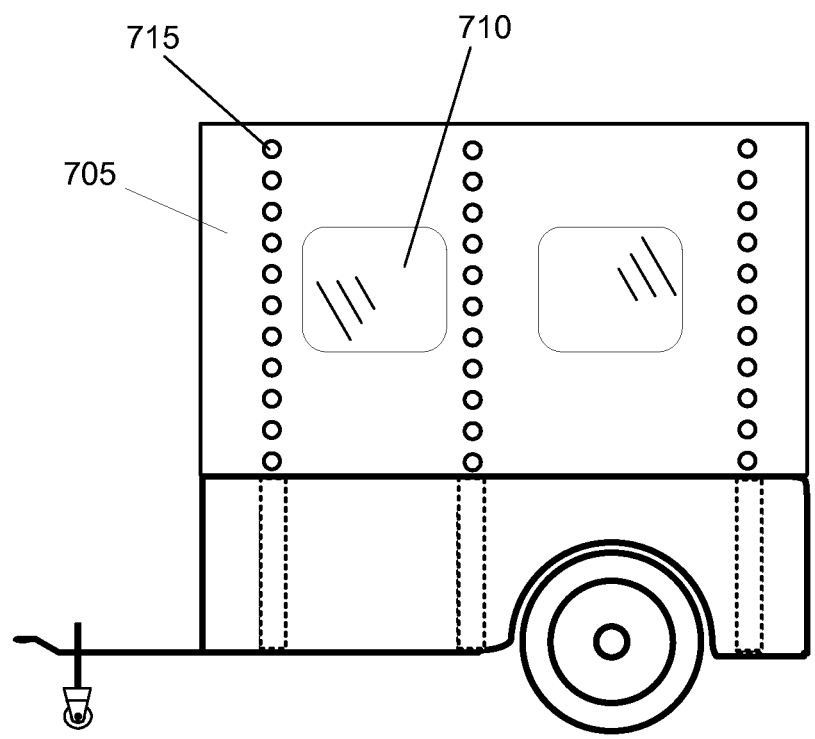
FIG. 7 is a side elevation view of a trailer with the telescoping cap-rails in extended position and a tarpaulin snapped on three extended telescoping extension poles on the left side of the trailer.

The system (100) includes a lock, which is preferably either a bolt and bolt-hole combination (325) where the bolt is manually inserted through aligned holes, or a spring-biased detent (410) that automatically engages when it passes a hole in an adjoining nested pole section. The bolt and bolt-hole combination (325) is shown in FIG. 3 within a dotted box.

The lock secures the plurality of pole sections in position with respect to each other when the pole top-section (305) extends above the distal end (130). Thus, when the plurality of pole sections includes a pole top-section (305), a pole middle-section (310), and a pole bottom-section (315), then the lock secures these three pole sections in a relatively fixed position so that the cap rail and the pole top-section can remain in place providing a structural skeleton of a wall raised above the distal end (130).

When the lock is the bolt and bolt-hole combination (325), it preferably comprises horizontally placed bolt holes through each of the pole sections so that a bolt can be inserted through the bolt holes to prevent movement of any two pole sections. Thus, in one embodiment each telescoping extension pole defines a plurality of horizontal bolt holes (330) spaced vertically when the pole top-section (305) of each such telescoping extension pole is above the distal end (130); and the lock comprises a bolt and bolt-hole combination (325) for each telescoping extension pole, the bolt fitting within aligned horizontal bolt holes to physically preclude relative movement of any two pole sections in the plurality of pole sections.

Preferably, the lock is a spring-biased detent (410) that automatically engages when the pole top-section (305) is extended to a point above the distal end (130). When the lock is a spring-biased detent (410) that automatically engages when it passes a hole in an adjoining nested pole section, this hole can be placed in one or more vertical positions, but it is preferably at least engageable when the telescoping extension poles are fully extended. The spring-biased detent (410) is a common push-button that springs out into a hole in a nested pole section. It is released by pressing the push-button, which re-enables one pole section to slide within another. When multiple holes are vertically spaced up the pole sections, then to prevent accidental engagement of the spring-biased detent (410) before the desired height is attained, the nested pole sections may be installed so as to permit rotation about a vertical axis to un-align the holes with the push button until the desired height is reached.

The structural skeleton formed by extended pole sections with the cap-rail at the top may optionally be structurally reinforced with cross-members or beams connecting telescoping extension poles in the same wall. The cross-members are best added through openings in one or more of the pole sections in order to tie together the telescoping pole sections. Thus, the system (100) may be enhanced when each telescoping extension pole defines an opening (320) extending horizontally through each telescoping extension pole. The opening (320) is accessible when the lock secures the plurality of pole sections in position. This embodiment of the system (100) further includes a horizontal beam (1005) that fits within each opening (320) to structurally connect telescoping extension poles.

Preferably, when the system (100) includes telescoping extension poles with having three pole sections in the plurality of pole sections, that is, having a pole top-section (305); a pole middle-section (310); and a pole bottom-section (315), then the opening (320) is best placed through the pole middle-section so that the reinforcement is midway between the distal end and the extended cap-rail. Other embodiments may include the opening in one or more of the other pole sections present in the plurality of telescoping extension poles (145).

FIG. 8 illustrates a portion of a preferred embodiment of the system (100) with a motor (805) that drives the extension and retraction of the plurality of telescoping extension poles (145) using a threaded connection (820). There is preferably one motor for each side wall. For example, one motor for the first wall (207) and one motor for the second wall (208), although some embodiments may have one motor operating the plurality of telescoping extension poles (145) in both side walls. The motor (805) may operate on one telescoping extension pole in the plurality of telescoping extension poles (145) because when one pole extends the others connected by the first cap-rail (140) must also extend. Thus, the motor (805) is operatively connected to at least one telescoping extension pole in the plurality of telescoping extension poles so that when activated, the motor (805) raises the cap-rail, that is for example, the first cap-rail (140) or the second cap-rail (141), from the distal end (130) to a higher elevation.

Instead of an added horizontal beam (1005), the system (100) may be reinforced by plywood sheets, or similar panels of other materials, which may be cut to suit the particular size trailer width or length. FIG. 6 shows the two cap-rails, that is the first cap-rail (140) and the second cap-rail (141) each having a downwardly curved C-shaped segment (505) positioned above an upwardly curved C-shaped segment (605). FIG. 5 shows an enlarged version of the second cap-rail (141), which is preferably the mirror image of the first cap-rail (140). Preferably, the two cap-rails and both the first wall (207) and the second wall (208) are equipped with the curved C-shaped segments, although a system (100) with only one wall of the trailer (105) having these curved C-shaped segments is possible. Thus, the first cap-rail (140) preferably comprises a downwardly curved C-shaped segment (505) positioned above an upwardly curved C-shaped segment (605) in the first wall (207). Similarly, the second cap-rail (141) preferably comprises a downwardly curved C-shaped segment (505) positioned above an upwardly curved C-shaped segment (605) in the second wall (208).

The structural skeleton formed by extended pole sections with the two cap-rails at the top may optionally be structurally reinforced with cross-members or beams connecting telescoping extension poles across the bed (210) connecting the plurality of pole sections in the first wall (207) and the second wall (208). These can be inserted along the bed-length (215) or across the bed-width (220) as may be desired for increased structural stability. A screw or other means may be used to secure each horizontal beam (1005) in place.

Thus, an embodiment of the system (100) has a channel on each cap-rail: A first channel (609) affixed to the first cap-rail (140) and a second channel (509) affixed to the second cap-rail (141). The second channel (509) is shown within the dashed box in FIG. 5 illustrating the second cap-rail (141). There is no substantive distinction intended by the use of the two terms: C-shaped segment and channel. The different terms are used as a matter of convenience and clarity to avoid confusion of terms in this description. They are illustrated differently merely to show some diversity in their potential designs. As can be seen with reference to FIG. 6, the channels face each other. Each channel is of sufficient size to slide a panel (610) between them and to retain the panel (610) between the channels to form a top or cover to the bed.

An embodiment of the system (100) includes a cover or tarpaulin (705) of sufficient size to traverse around the plurality of telescoping extension poles (145) when they are extended. The tarpaulin (705) would run from the first wall (207) at the distal end (130) up and over the first cap-rail (140), thence across the bed-width (220) to the second cap-rail (141) on the trailer-right-side (620) and down to the distal end (130) on the trailer-right-side (620). Thus, the system (100) may additionally comprises a tarpaulin (705) of sufficient size to extend from the first wall (207), up and over the first cap-rail (140) to the second cap-rail (141), and down to the second wall (208). The tarpaulin (705) may be canvas, plastic or any other material suitable for a cover to the bed (210).

The tarpaulin (705) may be secured by any means. For example it may have reinforced holes and ties or preferably have mating snap portions (905). Thus, an embodiment with a tarpaulin (705) includes mating snap portions (905) positioned on the tarpaulin (705) and the plurality of telescoping extension poles (145) to permit securing the tarpaulin (705) in place to form a cover over the bed (210). Preferably, a male snap portion (715) is on the tarpaulin (705) and a female snap portion (915) is on the plurality of telescoping extension poles (145).

The tarpaulin (705) may have a transparent plastic window (710) to enable someone within the bed to look out. This might be convenient when the trailer bed with the cover is used as a tent for sleeping. Thus, a preferred embodiment with a tarpaulin (705) has one or more plastic windows positioned on the tarpaulin (705). The term plastic is intended to be construed broadly to include any transparent synthetic material.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the trailer industry.

What is claimed is:

1. A system comprising
a trailer, the trailer comprising:
   a bed defining a rectangular area that is bounded by four walls, the four walls comprising a first wall; and a second wall facing the first wall, the first wall and the second wall rising vertically from the bed to a distal end;
   a first cap-rail atop the first wall; and
   a second cap-rail atop the second wall;
a plurality of telescoping extension poles vertically positioned within each of the first wall and the second wall;
   each telescoping extension pole in the plurality of telescoping extension poles comprises a plurality of pole sections, the plurality of pole sections comprising a pole top-section and a pole bottom-section;
   each telescoping extension pole in the first wall is connected at the pole top-section to the first cap-rail and immobilized at the pole bottom-section;
   each telescoping extension pole in the second wall is connected at the pole top-section to the second cap-rail and immobilized at the pole bottom-section; and
   each pole top-section is extensible upward above the distal end;
a lock securing the plurality of pole sections in position with respect to each other when the pole top-section extends above the distal end; and
wherein each telescoping extension pole defines an opening extending horizontally through each telescoping extension pole, said opening being accessible when the lock secures the plurality of pole sections in position; and further comprising a horizontal beam that fits within each opening to structurally connect telescoping extension poles.

2. The system of claim 1, wherein the plurality of pole sections further comprises a pole middle-section; and the opening is through the pole middle-section.

3. The system of claim 1, wherein the lock is a spring-biased detent that automatically engages when the pole top-section is extended to a point above the distal end.

4. The system of claim 1, further comprising a motor operatively connected to at least one telescoping extension pole in the plurality of telescoping extension poles.

5. The system of claim 1, wherein:
the first cap-rail comprises a downwardly curved C-shaped segment positioned above an upwardly curved C-shaped segment in the first wall; and
the lock is securable in a position such that a panel will be retained between the downwardly curved C-shaped segment and the upwardly curved C-shaped segment.

6. The system of claim 1, further comprising:
a first channel affixed to the first cap-rail;
a second channel affixed to the second cap-rail; and
wherein the first channel faces the second channel such that a panel can be slid between them while retaining the panel between the channels to form a top to the bed.

7. The system of claim 1, wherein:
each telescoping extension pole defines a plurality of horizontal bolt holes arranged vertically when the pole top-section of each such telescoping extension pole is above the distal end; and
the lock comprises a bolt and bolt-hole combination for each telescoping extension pole, the bolt fitting within aligned horizontal bolt holes to physically preclude relative movement of any two pole sections in the plurality of pole sections.

8. The system of claim 1, further comprising a tarpaulin of sufficient size to extend from the first wall, up and over the first cap-rail to the second cap-rail, and down to the second wall.

9. The system of claim 8, further comprising mating snap portions positioned on the tarpaulin and the plurality of telescoping extension poles to permit securing the tarpaulin in place to form a cover over the bed.

10. The system of claim 8, further comprising a transparent plastic window positioned on the tarpaulin.

* * * * *